US012715097B2

(12) United States Patent
Knyrim

(10) Patent No.: US 12,715,097 B2
(45) Date of Patent: Aug. 25, 2026

(54) ROTARY DRIVE FOR A HAND-HELD POWER TOOL

(71) Applicant: Hilti Aktiengesellschaft, Schaan (LI)

(72) Inventor: Maximilian Knyrim, Ehingen (DE)

(73) Assignee: Hilti Aktiengesellschaft, Schaan (LI)

( * ) Notice: Subject to any disclaimer, the term of this patent is extended or adjusted under 35 U.S.C. 154(b) by 481 days.

(21) Appl. No.: 17/637,360

(22) PCT Filed: Aug. 24, 2020

(86) PCT No.: PCT/EP2020/073621
§ 371 (c)(1),
(2) Date: Feb. 22, 2022

(87) PCT Pub. No.: WO2021/043612
PCT Pub. Date: Mar. 11, 2021

(65) Prior Publication Data
US 2022/0288760 A1 Sep. 15, 2022

(30) Foreign Application Priority Data
Sep. 4, 2019 (EP) .................................... 19195363

(51) Int. Cl.
*B25D 16/00* (2006.01)
*B25D 17/06* (2006.01)

(52) U.S. Cl.
CPC ........... *B25D 17/06* (2013.01); *B25D 16/003* (2013.01); *B25D 2216/003* (2013.01);
(Continued)

(58) Field of Classification Search
CPC ............................. B25D 16/003; B25D 17/06; B25D 2216/003; B25D 2250/045;
(Continued)

(56) References Cited

U.S. PATENT DOCUMENTS 1,494,109 A * 5/1924 Griner .................... B25D 11/08 29/76.1
1,871,020 A * 8/1932 Wyzenbeek ........... B23D 51/10 74/57
(Continued)

FOREIGN PATENT DOCUMENTS

CH 565283 A5 8/1975
CH 673007 A5 * 10/1987 ............. B25D 16/00
(Continued)

OTHER PUBLICATIONS

International Search Report of PCT/EP2020/073621, dated Nov. 13, 2020.
(Continued)

*Primary Examiner* — Shelley M Self
*Assistant Examiner* — David G Shutty
(74) *Attorney, Agent, or Firm* — Davidson Kappel LLC

(57) ABSTRACT

Rotary drive for driving a tool fitting of a hand-held power tool, in particular of a combination hammer or hammer drill, wherein the rotary drive is configured, with respect to a working axis of the tool fitting, to convert a thrust input movement into a rotary output movement, wherein the rotary drive is in the form of a slotted-link mechanism with a freewheel-mounted track body and a ball cage arranged coaxially with the track body, wherein, when the ball cage is subjected to the thrust input movement, at least one ball of the ball cage slides along in an endless track contour formed on an outer surface of the track body and thus brings about a rotation of the freewheel-mounted track body.

19 Claims, 4 Drawing Sheets

(52) U.S. Cl.
CPC .. *B25D 2250/045* (2013.01); *B25D 2250/121* (2013.01); *B25D 2250/231* (2013.01); *B25D 2250/321* (2013.01)

(58) Field of Classification Search
CPC ........ B25D 2250/121; B25D 2250/231; B25D 2250/321
See application file for complete search history.

(56) References Cited

U.S. PATENT DOCUMENTS

| | | | | | |
|---|---|---|---|---|---|
| 2,436,692 | A * | 2/1948 | Greene | B23D 49/162 | 144/35.2 |
| 2,474,056 | A * | 6/1949 | Larsen | F16H 25/12 | 74/57 |
| 2,490,449 | A * | 12/1949 | Lynch | B25D 11/005 | 74/57 |
| 3,260,289 | A * | 7/1966 | Whitten, Jr. | B23D 51/10 | 83/628 |
| 4,064,949 | A * | 12/1977 | Chromy | B25D 16/00 | 173/14 |
| 4,655,464 | A * | 4/1987 | Manschitz | B23B 31/1253 | 279/140 |
| 4,691,929 | A * | 9/1987 | Neumaier | B25D 17/088 | 279/81 |
| 4,732,218 | A * | 3/1988 | Neumaier | B25D 16/003 | 173/104 |
| 4,798,249 | A * | 1/1989 | Hoereth | B25D 11/005 | 173/200 |
| 4,878,679 | A * | 11/1989 | Plank | B25D 17/088 | 408/9 |
| 5,350,390 | A * | 9/1994 | Sher | E21B 4/20 | 606/171 |
| 5,467,684 | A * | 11/1995 | Sher | F01B 3/0079 | 74/129 |
| 5,513,709 | A * | 5/1996 | Fisher | B25D 11/102 | 173/205 |
| 5,676,497 | A * | 10/1997 | Kim | B28D 1/062 | 144/35.2 |
| 5,697,459 | A * | 12/1997 | Sher | A61B 17/320758 | 175/106 |
| 5,769,172 | A * | 6/1998 | Sher | B25F 5/005 | 173/97 |
| 5,899,112 | A | 5/1999 | Richter et al. | | |
| 6,012,346 | A * | 1/2000 | Vo | B23D 51/16 | 30/392 |
| 7,350,592 | B2 * | 4/2008 | Hahn | B25D 11/104 | 173/205 |
| 7,506,693 | B2 * | 3/2009 | Stirm | B25D 11/005 | 173/205 |
| 7,743,847 | B2 * | 6/2010 | Fisher | B25D 11/102 | 173/205 |
| 8,789,619 | B2 * | 7/2014 | Fisher | B25D 11/005 | 173/205 |
| 9,381,626 | B2 * | 7/2016 | Profunser | B25B 21/02 | |
| 10,315,298 | B2 * | 6/2019 | Herr | B25D 16/006 | |
| 2002/0162409 | A1 | 11/2002 | Ito et al. | | |
| 2006/0137888 | A1 | 6/2006 | Soika et al. | | |
| 2008/0237294 | A1 | 10/2008 | Tanimoto et al. | | |
| 2011/0017483 | A1 | 1/2011 | Baumann et al. | | |
| 2011/0311174 | A1 | 12/2011 | Doeppling et al. | | |
| 2014/0338945 | A1 | 11/2014 | Herr et al. | | |

FOREIGN PATENT DOCUMENTS

| | | | | |
|---|---|---|---|---|
| CN | 1149330 A | 5/1997 | | |
| CN | 1792564 A | 6/2006 | | |
| CN | 200981222 Y | 11/2007 | | |
| CN | 101274425 A | 10/2008 | | |
| CN | 102256754 A | 11/2011 | | |
| CN | 102362087 A | 2/2012 | | |
| CN | 104148703 A | 11/2014 | | |
| CN | 110153957 A | 8/2019 | | |
| DE | 102013002727 A1 * | 8/2014 | | B23B 51/101 |
| DE | 102013208890 A1 | 11/2014 | | |
| EP | 3181302 A1 * | 6/2017 | | F01B 3/0079 |
| GB | 1600944 A | 10/1981 | | |
| GB | 2421459 | 6/2006 | | |
| WO | WO 9504207 A1 | 2/1995 | | |
| WO | WO 9803309 A2 | 1/1998 | | |
| WO | WO 0196053 A1 | 12/2001 | | |

OTHER PUBLICATIONS

Quick Negative Chamfering Tool Based on Hand Tooling Grinder; Liu Song, Xie Bangquan, Liu Hua, Chen Jiaojiao; Chengdu Tool Research Institute Co., Ltd., 2014, see translation.

* cited by examiner

ROTARY DRIVE FOR A HAND-HELD POWER TOOL

The present invention relates to a rotary drive for driving a tool fitting of a hand-held power tool, in particular of a combination hammer or hammer drill. The rotary drive is configured, with respect to a working axis of the tool fitting, to convert a thrust input movement into a rotary output movement.

BACKGROUND

A rotary drive of this kind is known for example from EP 3 181 302 A1.

SUMMARY OF THE INVENTION

It is an object of the present invention to provide a comparatively compact and robust rotary drive. A further object of the present invention is to specify a hand-held power tool having such a rotary drive.

The present invention provides a rotary drive in the form of a slotted-link mechanism with a freewheel-mounted track body and a ball cage arranged coaxially with the track body, wherein, when the ball cage is subjected to the thrust input movement, at least one ball of the ball cage slides along in an endless track contour formed on an outer surface of the track body and thus brings about a rotation of the freewheel-mounted track body. The ball cage can have one or more balls. In particular, the ball, as a coupling element between the track body and the ball cage, is not connected fixedly to the track body or to the ball cage.

The invention incorporates the finding that when the drilling tool (striking and rotating tool) is varied, different drill bit diameters or drill bit types sometimes require a slower rotational speed of the tool fitting for the best possible drilling performance. This makes a step-down gear mechanism with a comparatively stronger reducing action necessary, this—at least in the hand-held power tools of the prior art—disadvantageously increasing the space requirement, the costs, the number of components, the complexity and the weight of these tools.

In the rotary drive of the invention, which is preferably incorporated in a hand-held power tool in the form of a hammer drill or combination hammer, use is made of a slotted-link mechanism. This is instead of spur gears and/or bevel gears, which are exclusively or at least predominantly used in hand-held power tools of the prior art. As a result, a comparatively compact and robust rotary drive can be provided.

In a particularly preferred configuration, the endless track contour is formed in an undulating and/or continuous manner. Particularly preferably, the endless track contour is free of track portions that are oriented parallel to the working axis of the tool fitting.

It has been found to be advantageous for the rotary drive to have a sleeve carrying the ball cage, wherein the sleeve engages at least partially around the track body. In a particularly preferred configuration, the track body is freewheel-mounted by way of a form-fitting or force-fitting freewheel. This makes it possible to ensure that the rotary output movement is executed only in one direction of rotation. Preferably, the track body has only one degree of freedom, preferably only one degree of rotational freedom about the working axis.

It has been found to be advantageous for the rotary drive in the form of a slotted-link drive to have a transmission ratio of 1:25.

In a particularly preferred configuration, the track body consists of plastic or exhibits such a plastic. The rotary drive may be free of metal gearwheels.

As regards the hand-held power tool, the present invention provides a hand-held power tool, in particular a hammer drill or combination hammer, having a tool fitting for holding a striking and rotating tool on a working axis, and having an electric motor. The hand-held power tool is equipped with a rotary drive of the above-described type, wherein the electric motor, for generating the thrust input movement, is coupled to the rotary drive and the rotary drive is arranged so as to drive a spindle carrying the tool fitting in rotation about the working axis.

In a particularly preferred configuration, the hand-held power tool is equipped with an impact mechanism that has a striker moved periodically along the working axis, wherein the electric motor is coupled to the impact mechanism. Particularly preferably, the electric motor is coupled to the impact mechanism via a transmission component that may have an impact-mechanism eccentric wheel or a wobble plate.

It has been found to be advantageous for the impact mechanism to be arranged at least partially within the track body and/or within the sleeve carrying the ball cage. In this way, the hand-held power tool can be embodied in a particularly compact manner.

In a particularly preferred configuration, the spindle, at a constant rotational speed of the electric motor, executes an irregular, pulsating rotary output movement. In particular, an oscillating movement and a rotary movement of the tool fitting can be phase offset, for example with a phase offset of 180 degrees.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
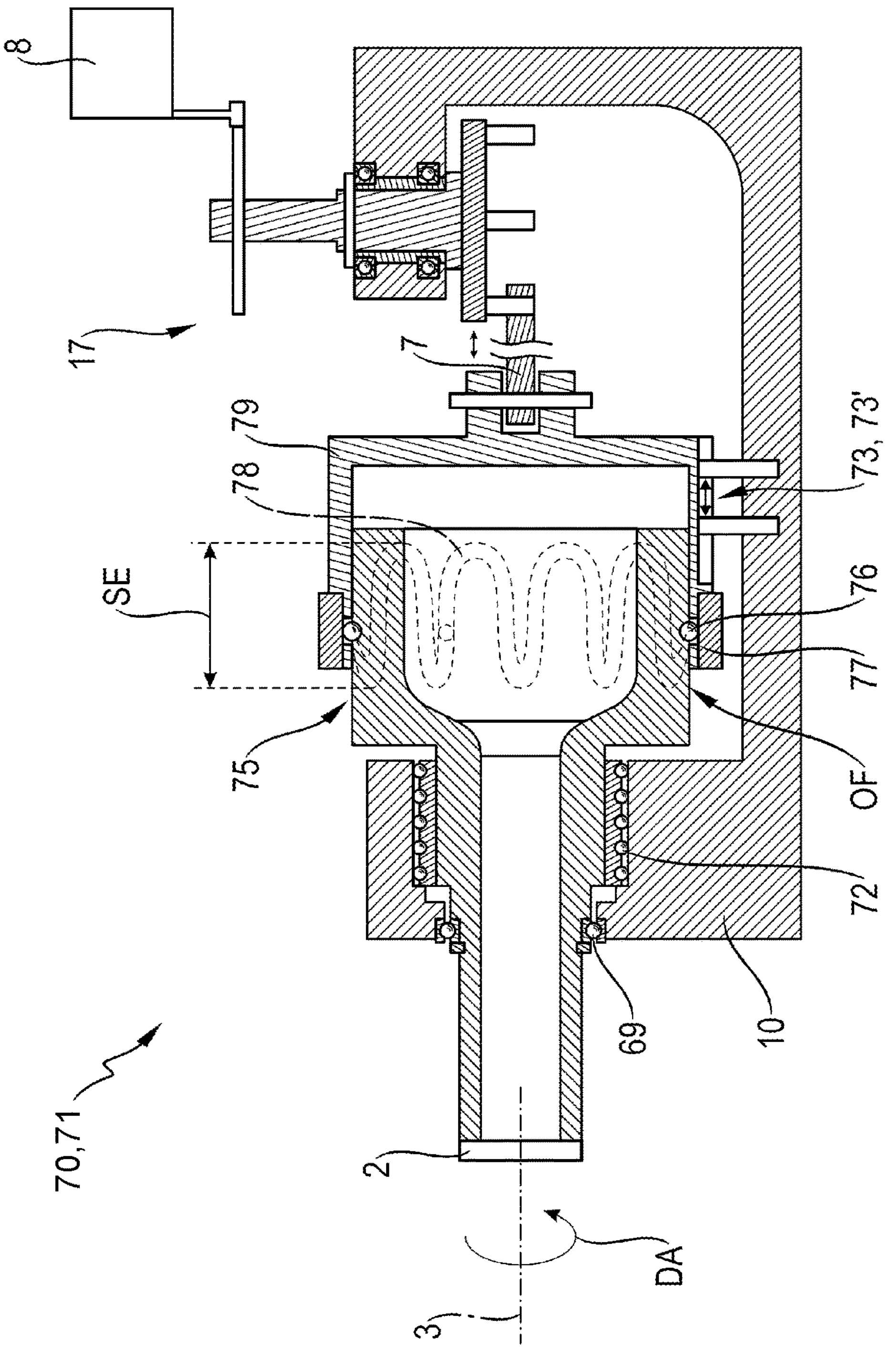
FIG. 1 shows a first preferred exemplary embodiment of a rotary drive.

A first preferred exemplary embodiment of a rotary drive 70 is illustrated in FIG. 1. The rotary drive 70 serves to drive a tool fitting 2 (only schematically illustrated here) of a hand-held power tool 100 (cf. FIG. 4). The rotary drive 70 is configured, with respect to a working axis 3 of the tool fitting 2, to convert a thrust input movement SE into a rotary output movement DA.

The rotary drive 70 is in the form of a slotted-link mechanism 71 with a freewheel-mounted track body 75 and a ball cage 77 arranged coaxially with the track body, wherein, when the ball cage 77 is subjected to the thrust input movement SE, at least one ball 76 of the ball cage 77 slides along in an endless track contour 78 formed on an outer surface OF of the track body 75 and thus brings about a rotation of the freewheel-mounted track body 75 about the working axis 3.

As can be gathered from FIG. 1, the rotary drive 70 has a sleeve 79 carrying the ball cage 77, wherein the sleeve 79 engages at least partially around the track body 75. The sleeve 79 is connected to an electric motor, which is illustrated only schematically here, via a transmission component 17 that a connecting rod 7 and an impact-mechanism eccentric wheel 21. By means of the transmission component 17, the cyclical thrust input movement SE of the sleeve 79 is generated. The rotary drive in the form of a slotted-link drive 71 has for example a transmission ratio of 1:25, i.e. 25 strokes of the thrust input movement SE are necessary in order to displace the track body 75 through 360 degrees about the working axis 3.

On that side of the rotary drive 70 that faces the tool fitting 2, the track body 75 is freewheel-mounted in a freewheel 72 configured in this case for example in a form-fitting manner. By way of the freewheel 72, it is possible to ensure that the rotary output movement DA is executed only in one direction of rotation (indicated by the arrow tip at DA). Preferably, the rotary drive 70 has an anti-rotation safeguard 73 for the sleeve 79, in this case for example in the form of a slot/pin pairing 73'. In the direction of the working axis 3, the track body 75 is mounted immovably with respect to the machine housing 10, in this case for example by means of a fixed bearing 69.

A preferred track body 75 will now be described with reference to FIG. 2. Here, FIG. 2A shows a perspective illustration of the track body 75. An enlarged portion of the outer surface OF of the track body 75 is illustrated in FIG. 2B. The track body 75, which consists for example of plastic, has an undulating endless track contour 78 in the circumferential direction U. The endless track contour 78 extends all the way around in the circumferential direction U. The endless track contour 78 is free of track portions that are oriented parallel to the working axis 3. This favors continuous sliding and/or rolling of one or more balls 76 of the ball cage, and this will now be described in more detail with reference to FIG. 3.

Figure 2:
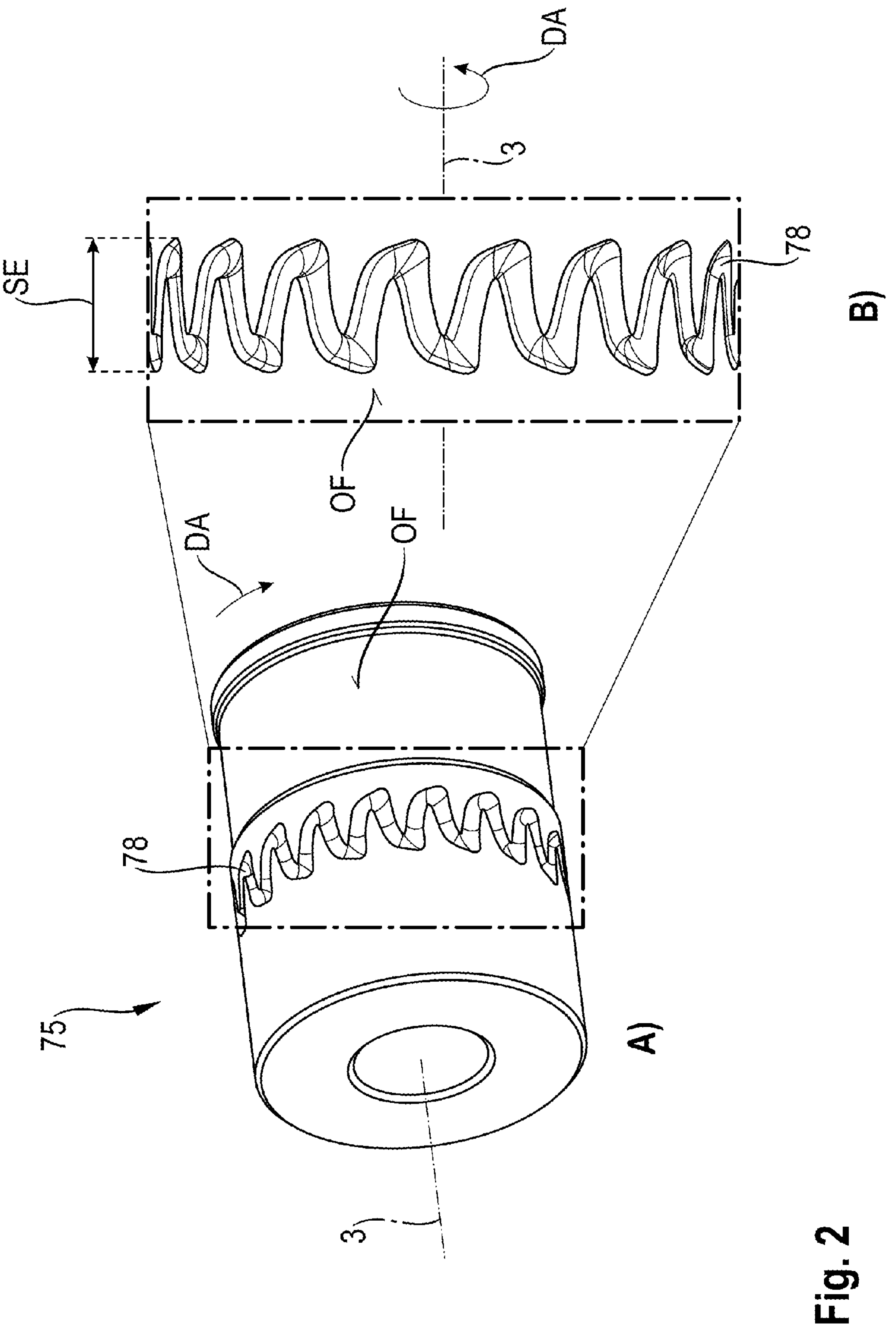
FIG. 2 shows a track body of the rotary drive in FIG. 1.
Figure 3:
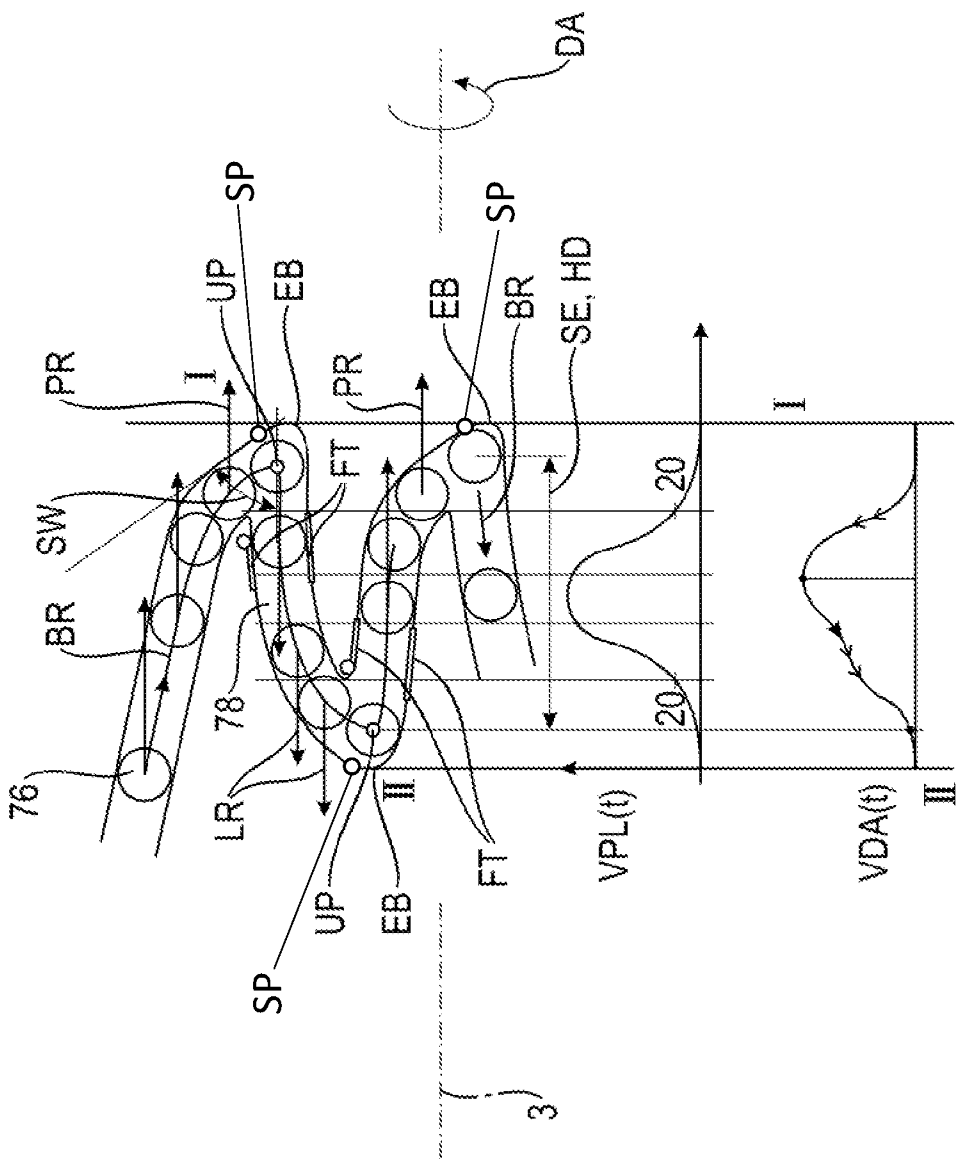
FIG. 3 shows a schematic illustration of an endless track contour.

FIG. 3 shows a schematic illustration of the endless track contour 78 in FIG. 2. A guide body in the form of a ball 5 (illustrated in a plurality of positions in FIG. 2) runs in the endless track contour 78, to be more precise slides and/or rolls therein. The ball 5 is driven by a cyclical movement in translation SE (which is defined by the stroke distance HD of the connecting rod 7), wherein the arrows PR oriented toward the right each indicate "pulling" of the connecting rod 7 (cf. FIG. 1). The arrows LR that are oriented toward the left here each indicate "pushing" of the connecting rod 7 (cf. FIG. 1).

As a result of the track geometry shown, the ball always slides and/or rolls in the same track direction BR. As mentioned above, the endless track contour 78 is arranged in the circumferential direction U on an outer surface OF of the cylindrical track body 75. The only remaining degree of freedom of the cylindrical track body 75 is the rotary output movement DA about the cylinder axis, which in this case coincides with the working axis 3. The endless track contour 78 is designed such that the ball 76 can always move freely. The corners of the track contour always reliably passed through by the ball 76 of the ball cage 77 in the same track direction BR. Since the track body 75 can rotate as a single degree of freedom (rotation about the working axis 3) and the ball 76 is moved cyclically in translation along the working axis 3, a rotary output movement DA is produced by the endless track contour 78. The rotary output movement DA takes place upon each forward stroke (arrows LR oriented toward the left) and rearward stroke (arrows PR oriented toward the right) equally. The speed VDA of the rotary output movement DA is irregular as a physical result of the track contour (similar to a pulsating behavior).

As a result of the comparatively large helix angle SW (for example greater than 60 degrees here) in the respective corner regions EB of the endless track contour 78, the ball 76 is located significantly beneath a singular point SP of the endless track contour 78 at its turning points UP and, upon the return movement (arrows PR oriented toward the right), is captured reliably by the collecting funnel FT, i.e. a relative widening of the endless track contour 78, which makes it easier to "catch" the ball 76. It has been found that when the driven tool 4 (cf. FIG. 4) acts in the manner of an elastic torsion spring, at a corresponding torque, there is the risk of a return movement of the ball 76 in the endless track contour 78 (that is to say counter to the track direction BR). In order to avoid this behavior, the invention provides a freewheel 72 (cf. FIG. 1), which blocks the opposite rotary movement (in the opposite direction to the rotary output movement DA).

Finally, in the lower region of FIG. 3, the profile of the speed VPL of the thrust input movement SE (speed of the connecting rod 7 overtime) and the profile of the speed VDA of the rotary output movement DA (speed of the rotating track body 75 over time) are illustrated.

Figure 4:
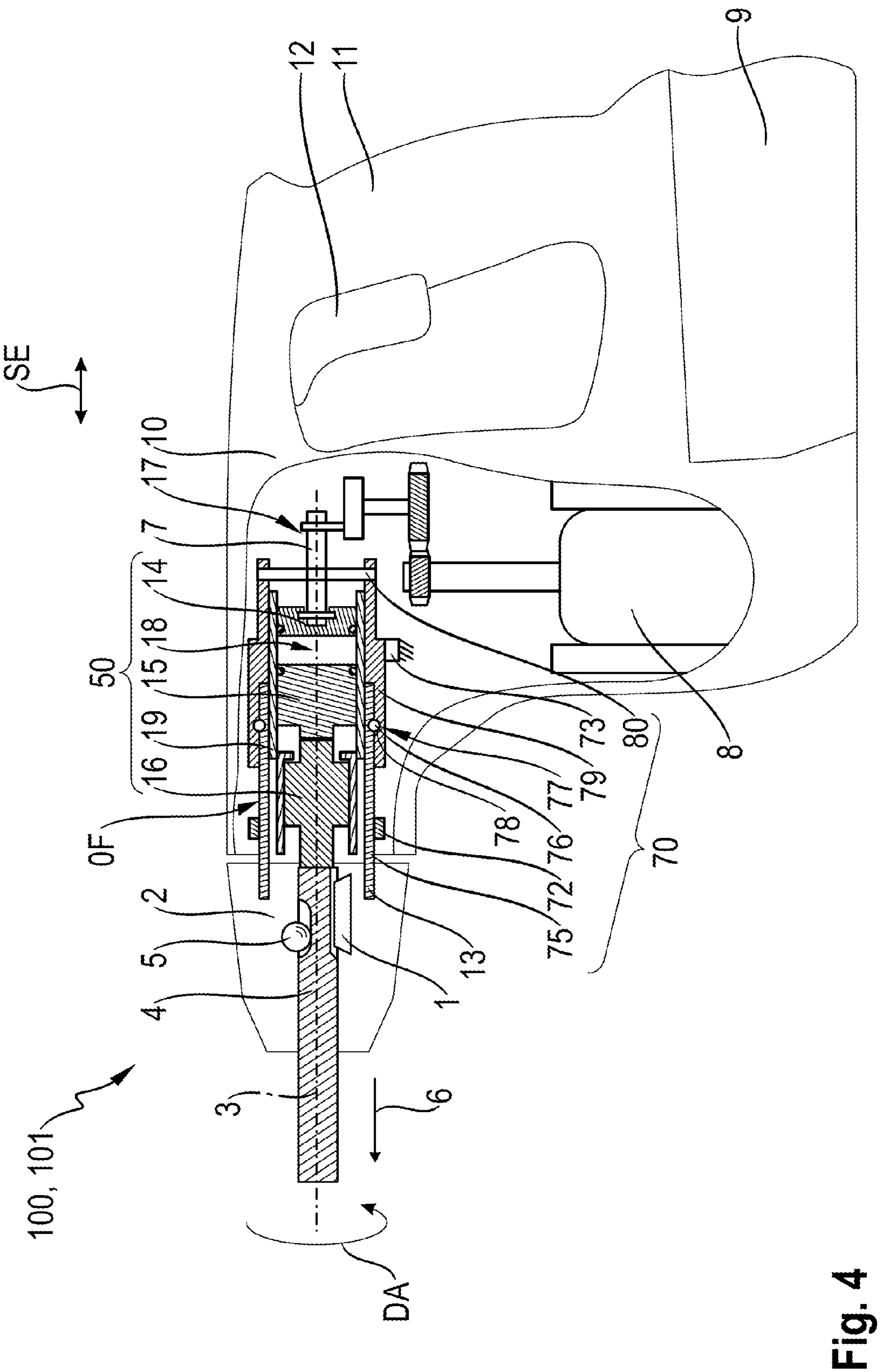
FIG. 4 shows a preferred exemplary embodiment of a hand-held power tool having a rotary drive.

A preferred exemplary embodiment of a hand-held power tool 100 according to the invention having a rotary drive 70 is illustrated in FIG. 4. FIG. 4 shows a hammer drill 101 as an example of a percussive portable hand-held power tool 100. The hammer drill 101 has a tool fitting 2, into which a drill bit, chisel or other striking tool 4 can be inserted and locked in place coaxially with the working axis 3. The hammer drill 101 has a pneumatic impact mechanism 50, which can periodically exert blows in a striking direction 6 on the tool 4. A rotary drive 70 according to the invention can rotate the tool fitting 2 about the working axis 3. The pneumatic impact mechanism 50 and the rotary drive 70 are driven by an electric motor 8, which is fed with electric current by a rechargeable battery 9 or a power cord.

The impact mechanism 50 and the rotary drive 70 are arranged in a machine housing 10. A handle 11 is typically arranged on a side of the machine housing 10 that faces away from the tool fitting 2. The user can hold and guide the hammer drill 101 by means of the handle 11 during operation. An additional auxiliary handle can be fastened close to the tool fitting 2. Arranged on or in the vicinity of the handle 11 is an operating button 12, which the user can actuate preferably with the holding hand. The electric motor 8 is switched on by the actuation of the operating button 12. Typically, the electric motor 8 rotates for as long as the operating button 12 is kept pressed.

The tool 4 is movable along the working axis 3 in the tool fitting 2. For example, the tool 4 has an elongate groove, in which a blocking ball 5 or some other blocking body of the tool fitting 2 engages. The user holds the tool 4 in a working position in that the user presses the tool 4 indirectly against a substrate by way of the hammer drill 101.

The tool fitting 2 is fastened to a spindle 13 of the rotary drive 70, wherein the spindle 13 is in this case formed integrally with the track body 75 of the rotary drive. The tool fitting 2 can rotate about the working axis 3 with respect to the machine housing 10. At least one claw 1 or other suitable means in the tool fitting 2 transmits a torque from the tool fitting 2 to the tool 4.

According to the invention, the rotary drive 70 is in the form of a slotted-link mechanism 71 with a freewheel-mounted 75 track body and a ball cage 77 arranged coaxially with the track body 75. If the ball cage 77 is subjected to the thrust input movement SE, one ball 76 of the ball cage 77 slides along in an endless track contour 78 formed on an outer surface of the track body 75, with the result that a rotation (about the working axis 3 in the arrow direction of the rotary output movement DA) of the freewheel-mounted (for example by a form-fitting freewheel 72 in this case) track body 75 is brought about.

The pneumatic impact mechanism 50 has, in the striking direction 6, an exciter 14, a striker 15 and an anvil 16. The exciter 14 is forced to execute a periodic movement along the working axis 3 by means of the electric motor 8. The exciter 14 is attached via a transmission component 17 for converting the rotary movement of the electric motor 8 into a periodic movement in translation along the working axis 3. An example of a transmission component 17 contains an impact-mechanism eccentric wheel 21 or a wobble plate. A period of the movement in translation of the exciter 14 is defined by the rotational speed of the electric motor 8 and optionally by a reduction ratio in the transmission component 17. The connecting rod 7, which is fastened to a sleeve 79 of the rotary drive 70 by means of a connecting pin 80, is readily apparent. It is readily apparent that the sleeve 79 carries the ball cage 76 and the sleeve 79 engages partially around the track body, i.e. engages around in particular in the region of the ball cage 76. Via the transmission component 17, both the rotary drive 70 and the impact mechanism 50 are coupled to the electric motor of the hand-held power tool 100. As can be gathered from FIG. 4, the impact mechanism 50 is arranged at least partially within the track body 75 and partially within the sleeve 79 carrying the ball cage 77.

The striker 15 couples to the movement of the exciter 14 via a pneumatic spring. The pneumatic spring is formed by a pneumatic chamber 18 closed off between the exciter 14 and the striker 15. The striker 15 moves in the striking direction 6 until the striker 15 strikes the anvil 16. The anvil 16 bears against the tool 4 in the striking direction 6 and transmits the impact to the tool 4. The period of the movement of the striker 15 is identical to the period of the movement of the exciter 14. The striker 15 thus strikes with a striking rate that is identical to the inverse of the period. The optimal striking rate is defined by the mass of the striker 15 and the geometric dimensions of the pneumatic chamber 18. An optimal striking rate may lie in the range between 25 Hz and 100 Hz.

The example of an impact mechanism 50 has a piston-like exciter 14 and a piston-like striker 15, which are guided along the working axis 3 by a guide tube 19. The exciter 14 and the striker 15 bear with their lateral surfaces against the inner surface of the guide tube 19. The pneumatic chamber 18 is closed off along the working axis 3 by the exciter 14 and the striker 15 and in a radial direction by the guide tube 19. Sealing rings in the lateral surfaces of the exciter 14 and striker 15 can improve the airtight closing off of the pneumatic chamber 18.

The rotary drive 70 contains the spindle 13, which is arranged coaxially with the working axis 3. The spindle 13 is for example hollow, and the impact mechanism 50 is arranged within the spindle. The tool fitting 2 is fitted on the spindle 13. The tool fitting 2 can be connected releasably or permanently to the spindle 13 via a closing mechanism.

The spindle 13 rotates preferably periodically. Preferably, the spindle 13 is rotated continuously but with a speed (caused by the rotary drive 70 in the form of a slotted-link mechanism 71) that is dependent on rotational position. Thus, the spindle 13, at a constant rotational speed of the electric motor 8, executes an irregular, pulsating rotary output movement DA. The rotary drive 70 is synchronized with the impact mechanism 50, wherein the striking movement and rotary movement can be phase offset, for example through 180 degrees.

LIST OF REFERENCE SIGNS

1 Claw
2 Tool fitting
3 Working axis
4 Striking tool
5 Blocking ball
6 Striking direction
7 Connecting rod
8 Electric motor
9 Rechargeable battery
10 Machine housing
11 Handle
12 Operating button
13 Spindle
14 Exciter
15 Striker
16 Anvil
17 Transmission component
18 Pneumatic chamber
19 Guide tube
21 Impact-mechanism eccentric wheel
50 Impact mechanism
69 Fixed bearing
70 Rotary drive
71 Slotted-link mechanism
72 Freewheel
73 Anti-rotation safeguard
75 Track body
76 Ball
77 Ball cage
78 Endless track contour
79 Sleeve
80 Connecting pin
100 Hand-held power tool
101 Hammer drill
BR Track direction
DA Rotary output movement
EB Corner region
HD Stroke distance of the connecting rod
FT Collecting funnel
LR Arrows oriented toward the left
OF Surface
PR Arrows oriented toward the right
SE Thrust input movement
SP Singular point
SW Helix angle
U Circumferential direction
UP Turning point
VPL Speed of the thrust input movement
VDA Speed of the rotary output movement

The invention claimed is:

1. A rotary drive for driving a tool fitting of a hand-held power tool, the rotary drive configured, with respect to a working axis of the tool fitting, to convert a thrust input movement into a rotary output movement, the rotary drive comprising:

a slotted-link mechanism having a freewheel-mounted track body and a ball cage arranged coaxially with the track body, wherein, when the ball cage is subjected to the thrust input movement, at least one ball of the ball cage slides along in an endless track contour formed on an outer surface of the track body to bring about a rotation of the freewheel-mounted track body;

wherein the track body is freewheel-mounted by way of a form-fitting or force-fitting freewheel.

2. The rotary drive as recited in claim 1 wherein the endless track contour is formed in an undulating manner.

3. The rotary drive as recited in claim 1 wherein the endless track contour is formed in a continuous manner.

4. The rotary drive as recited in claim 1 further comprising a sleeve carrying the ball cage, wherein the sleeve engages at least partially around the track body.

5. The rotary drive as recited in claim 4 further comprising an anti-rotation safeguard for the sleeve.

6. The rotary drive as recited in claim 1 wherein the slotted link mechanism is a slotted-link drive having a transmission ratio of 1:25.

7. The rotary drive as recited in claim 1 wherein the track body consists of plastic.

8. The rotary drive as recited in claim 1 wherein the freewheel allows rotary motion to be executed only in one direction of rotation.

9. The rotary drive as recited in claim 1 wherein the track body has only one degree of freedom.

10. The rotary drive as recited in claim 1 wherein the track body has only one rotational degree of freedom about the working axis.

11. A hand-held power tool comprising:

a tool fitting for holding a striking and rotating tool on a working axis;

an electric motor; and the rotary drive as recited in claim 1, wherein the electric motor is for generating the thrust input movement and is coupled to the rotary drive and the rotary drive is arranged so as to drive a spindle carrying the tool fitting in rotation about the working axis.

12. The hand-held power tool as recited in claim 11 further comprising an impact mechanism having a striker moved periodically along the working axis, wherein the electric motor is coupled to the impact mechanism.

13. The hand-held power tool as recited in claim 12 wherein the impact mechanism is arranged at least partially within the track body.

14. The hand-held power tool as recited in claim 12 wherein the rotary drive has a sleeve carrying the ball cage, the sleeve engaging at least partially around the track body and the impact mechanism is arranged at least partially within the sleeve carrying the ball cage.

15. The hand-held power tool as recited in claim 11 wherein the spindle, at a constant rotational speed of the electric motor, executes an irregular, pulsating rotary output movement.

16. A combination hammer or hammer drill comprising the hand-held power tool as recited in claim 11.

17. A combination hammer or hammer drill comprising the rotary drive as recited in claim 1.

18. A rotary drive for driving a tool fitting of a hand-held power tool, the rotary drive configured, with respect to a working axis of the tool fitting, to convert a thrust input movement into a rotary output movement, the rotary drive comprising:

a slotted-link mechanism having a freewheel-mounted track body and a ball cage arranged coaxially with the track body, wherein, when the ball cage is subjected to the thrust input movement, at least one ball of the ball cage slides along in an endless track contour formed on an outer surface of the track body to bring about a rotation of the freewheel-mounted track body; a sleeve carrying the ball cage, wherein the sleeve engages at least partially around the track body; and an anti-rotation safeguard for the sleeve, wherein the anti-rotation safeguard includes a slot/pin pairing.

19. A rotary drive for driving a tool fitting of a hand-held power tool, the rotary drive configured, with respect to a working axis of the tool fitting, to convert a thrust input movement into a rotary output movement, the rotary drive comprising:

a slotted-link mechanism having a freewheel-mounted track body and a ball cage arranged coaxially with the track body, wherein, when the ball cage is subjected to the thrust input movement, at least one ball of the ball cage slides along in an endless track contour formed on an outer surface of the track body to bring about a rotation of the freewheel-mounted track body;

wherein the track body is mounted immovably with respect to a machine housing in a direction of the working axis via a fixed bearing.

* * * * *